US012339628B2

(12) United States Patent
Ganshof Van Der Meersch

(10) Patent No.: US 12,339,628 B2
(45) Date of Patent: Jun. 24, 2025

(54) WATCH WINDER, AND WATCH WINDER ASSEMBLY

(71) Applicant: SWISS INDUSTRIAL CONSULTING & TECHNOLOGY SA, Morges (CH)

(72) Inventor: Nicolas Ganshof Van Der Meersch, Morges (CH)

(73) Assignee: SWISS INDUSTRIAL CONSULTING & TECHNOLOGY SA, Morges (CH)

( * ) Notice: Subject to any disclaimer, the term of this patent is extended or adjusted under 35 U.S.C. 154(b) by 388 days.

(21) Appl. No.: 17/771,567

(22) PCT Filed: Oct. 26, 2020

(86) PCT No.: PCT/EP2020/080083
§ 371 (c)(1),
(2) Date: Apr. 25, 2022

(87) PCT Pub. No.: WO2021/079005
PCT Pub. Date: Apr. 29, 2021

(65) Prior Publication Data

US 2022/0382222 A1 Dec. 1, 2022

(30) Foreign Application Priority Data

Oct. 24, 2019 (GB) ...................................... 1915466

(51) Int. Cl.
*G04D 7/00* (2006.01)

(52) U.S. Cl.
CPC .................................... *G04D 7/009* (2013.01)

(58) Field of Classification Search
CPC ........ G04D 7/009; G04D 7/006; G04B 3/006; G04C 1/12; G04C 1/062; G04C 1/082; G04C 13/105; G04C 9/08
See application file for complete search history.

(56) References Cited

U.S. PATENT DOCUMENTS 2,860,534 A 11/1958 Nelson
6,254,270 B1 * 7/2001 Agnoff ................... G04D 7/009 81/7.5
6,439,761 B1 * 8/2002 Agnoff ................... G04B 3/006 81/7.5

(Continued)

*Primary Examiner* — Edwin A. Leon
(74) *Attorney, Agent, or Firm* — Nixon Peabody LLP; David S. Resnick; Nicole D. Kling

(57) ABSTRACT

Described herein is a watch winder comprising a fixed assembly having a central shaft; a rotatable assembly rotatably mounted to the central shaft and comprising a housing having distal end configured to receive a watch; and a drive assembly mounted on the fixed assembly and configured to rotate the rotatable assembly about the central shaft and comprising a motor, drive gear, and a battery assembly operatively connected to the motor. The drive assembly is mounted to the fixed assembly within the housing of the rotatable assembly, and the central shaft extends proximally of the housing. The housing is axially mounted on the central shaft by means of a distal bearing plate and a spaced apart proximal bearing plate, wherein the drive assembly is fixed to the central shaft between the two spaced apart bearings plates.

13 Claims, 4 Drawing Sheets

(56) References Cited

U.S. PATENT DOCUMENTS

| | | | | |
|---|---|---|---|---|
| 6,964,513 | B1 * | 11/2005 | Agnoff | G04D 7/009 81/7.5 |
| 7,530,733 | B2 * | 5/2009 | Louie | G04D 7/009 81/7.5 |
| 2005/0254352 | A1 * | 11/2005 | Wolf, V | G04B 3/006 368/206 |

* cited by examiner

WATCH WINDER, AND WATCH WINDER ASSEMBLY

CROSS-REFERENCE TO RELATED APPLICATIONS

This application is a 35 U.S.C. § 371 National Phase Entry Application of International Application No. PCT/EP2020/080083 filed Oct. 26, 2020, which designates the U.S. and claims benefit under 35 U.S.C. § 119(a) of GB Provisional Application No. 1915466.5 filed Oct. 24, 2019, the contents of which are incorporated herein by reference in their entireties.

FIELD OF THE INVENTION

The present invention relates to a watch winder, and a watch winder assembly.

BACKGROUND TO THE INVENTION

Watch winders, also known in the trade as remontoires, are employed to rewind automatic wrist watches. The watch winder comprises a body, a watch support (holder) adapted to hold the watch, and an electromechanical mechanism to fully or partially rotate the body, or the watch holder relative to the body, to cause re-winding of the watch held in place on the watch winder. Rotation of the watch causes a rotor within the watch to turn which in turn re-charges the watches' mainspring. Most watch winders can be programmed to set the rotation rate (re-winding rate) at a constant rate that is specific to a given automatic watch. An example of a watch winder is the T-Winder™ watch winder sold by SILT of Morges Switzerland. This watch winder is designed so that the whole assembly (watch mounting, motor, drive mechanism, batteries and electronics) is contained within a drum that rotates on a fixed axle. This watch winder is shown in FIGS. 1-3 (prior art) and comprises a fixed assembly A and a rotatable assembly B rotatably mounted to the fixed assembly. A watch-holding drum (not shown) forms part of the rotatable assembly. The fixed assembly has a base C, central shaft D, and a fixed gear E. The rotatable assembly B comprises a base plate F rotatably mounted to the shaft D, battery mounting G fixed to the base plate F for rotation therewith, and a drive assembly H fixed to a periphery of the base plate F having a motor I and rotatable gear J. The rotatable gear J is coupled to the fixed gear E whereby rotation of the rotatable gear J effects rotation of the rotatable assembly B about the fixed assembly.

A problem with this device is that the battery housing (and battery) and motor form part of the rotatable assembly, thereby increasing the amount of energy required to rotate the watch holding drum, and increasing the operational noise of the device.

The company Kubik partially address this problem by providing a watch winder having a base plate, a rotatable assembly configured to receive a watch rotatably attached to the base plate, and a drive mechanism fixed to a side of the base plate and operably coupled to the rotatable assembly for rotation of the rotatable assembly on the base plate. A problem with this device is that it requires an outer housing to enclose the rotatable assembly and the drive mechanism, and the requirement for a base plate to which all of the components have to be mounted.

CH707984 describes a watch winder in which the motor, batteries and electronics are attached to the rotating assembly and as such has the same problem as the T-Winder™ watch winder described above.

It is an object of the invention to overcome at least one of the above-referenced problems.

SUMMARY OF THE INVENTION

The Applicant has addressed the problems of the prior art by providing a watch winder that incorporates a drive mechanism that is not attached to the rotatable assembly, that does not require a base plate, and does not require an outer housing to enclose the rotatable assembly and drive assembly. This has been achieved by providing an assembly having a stator comprising a central shaft (axle) and a fixed assembly mounted to the central shaft and comprising a drive assembly, and a rotatable assembly (rotor) having a housing operably coupled to the drive assembly and that encloses the drive assembly. The provision of the drive assembly that is supported on the central shaft allows it to be enclosed within the housing of the rotatable assembly, thereby hiding it from view and obviating the requirement for an outer housing. Moreover, mounting the drive assembly on the central shaft obviates the need for a base plate to which all of the components are attached, thereby allowing the watch winder to be simply attached to a support (i.e. a base plate or a hole in a wall) by means of the central shaft which extends proud of the proximal end of the housing.

In a first aspect, the invention provides a watch winder of the type comprising:

- a fixed assembly having a central shaft;
- a rotatable assembly rotatably mounted to the central shaft and comprising a housing configured to receive a watch (generally, a distal end of the housing is configured to receive the watch); and
- a drive assembly mounted on the fixed assembly to and configured to rotate the rotatable assembly about the central shaft and comprising a motor, drive gear, and optionally a battery assembly operatively connected to the motor.

The drive assembly and fixed assembly are typically mounted (disposed) within the housing of the rotatable assembly, and the central shaft extends proximally of the housing to mount the watch winder to a support.

The watch winder of the invention provides a device that is more efficient to operate, due to the drive mechanism being accommodated on the fixed assembly part of the device. The device is also easier to manufacture, as it does not require a base plate to which all of the components are attached, and does not require an outer housing to hide the drive assembly. Also, the device is easily mounted to a support by simply inserting the exposed section of the central shaft into a hole in a wall or a support base.

In one embodiment, the housing is axially mounted on the central shaft by means of a distal bearing plate and a proximal bearing plate, wherein the drive assembly is fixed to the central shaft between the two spaced apart bearings plates. The provision of bearing plates for the housing that are spaced apart, results in less force being exerted on the bearings, and therefore more efficient operation and less noise.

The plates are generally rotatably mounted to the central shaft via holes, and typically comprise ball bearings.

In one embodiment, one of the bearing plates is operatively coupled to the drive assembly for rotation of the rotatable assembly.

In one embodiment, one of the bearing plates comprises a gear configured to associate with a gear of the drive gear.

In one embodiment, the distal bearing plates is operatively coupled to the drive assembly for rotation of the rotatable assembly.

In one embodiment, the distal bearing plate comprises a gear operatively coupled to the drive gear of the fixed assembly (i.e. the teeth of the gears intermesh).

In one embodiment, the gear of the distal bearing plate is disposed on an inner circumference of the distal bearing plate.

In one embodiment, the gear of the distal bearing plate comprises teeth formed on a circumferential wall of a recessed central portion of the distal bearing plate.

In one embodiment, the drive gear of the drive assembly comprises two or more drive gears.

In one embodiment, the proximal bearing comprises an end plate of the housing. In one embodiment, the distal bearing comprises a plate disposed intermediate the ends of the housing and fixed to the housing.

In one embodiment, the bearings comprise ball bearings.

In one embodiment, the drive assembly comprises a frame fixed to the central shaft comprising a battery mounting on one side of the frame and the motor and drive gear disposed on an opposite side of the frame.

In one embodiment, the frame comprises a processor operatively coupled to the motor and configured to control the rotation of the rotatable assembly during a watch winding operation.

In one embodiment, the battery mounting is configured to receive a LR14 battery (1.5V). In one embodiment, the battery mounting is configured to receive two LR14 batteries.

In one embodiment, the distal end of the housing has a recess configured to receive a watch or a watch holder. Watch holders for watch winders are known in the art (see EP2890276 for example).

In one embodiment, the housing comprises a drum, typically a cylindrical drum.

The invention also provides a watch winder assembly comprising a watch winder according to the invention and a support configured for coupling to a proximal end of the central shaft, in which the support typically comprises a free-standing base or a support configured for fixing to a support surface, for example a wall or table.

In one embodiment, the watch winder assembly comprises a watch holder configured for coupling to the housing.

The invention also relates a method of re-winding a watch using a watch winder of the invention and comprising a step of placing the watch to be re-wound into the housing of the watch winder, and actuating the watch winder to rotate the housing to re-wind the watch.

Other aspects and preferred embodiments of the invention are defined and described in the other claims set out below.

DETAILED DESCRIPTION OF THE INVENTION

Figure 2:
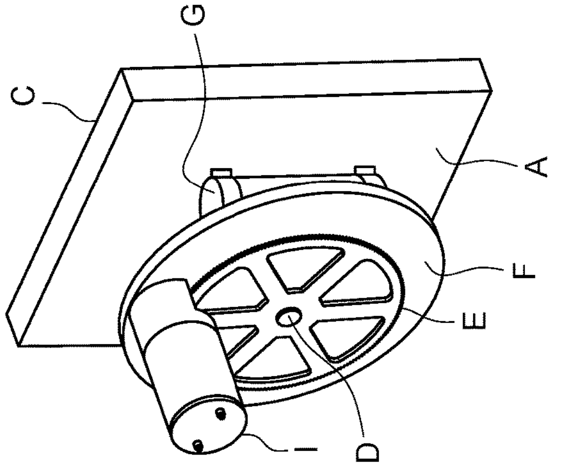
FIG. 2 (prior art) is a side perspective view of the watch winder of FIG. 1.
Figure 3:
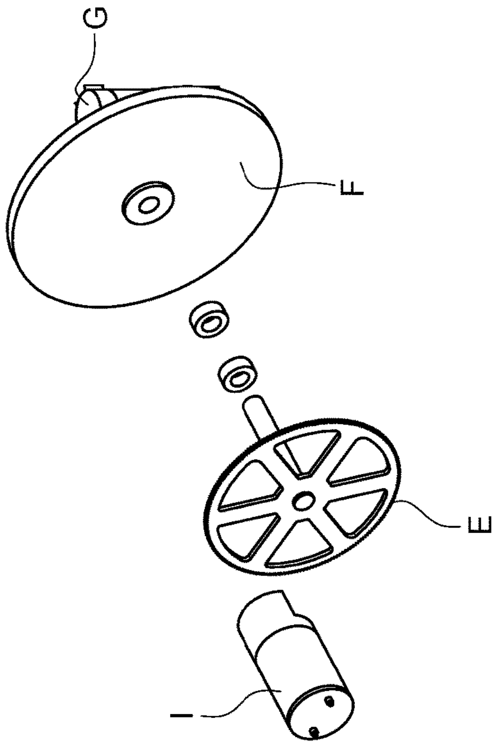
FIG. 3 (prior art) is a perspective, exploded, view of the watch winder of FIG. 2.
Figure 1:
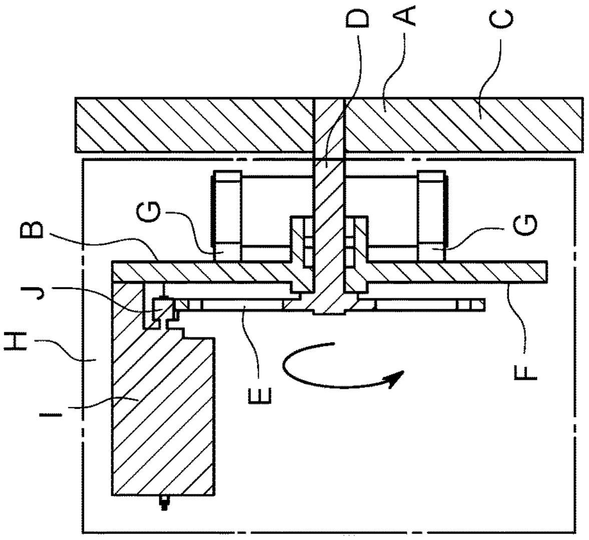
FIG. 1 (prior art) is a side sectional view of a known watch winder in which the drive assembly is fixed to the rotatable assembly part of the watch winder.
Figure 5:
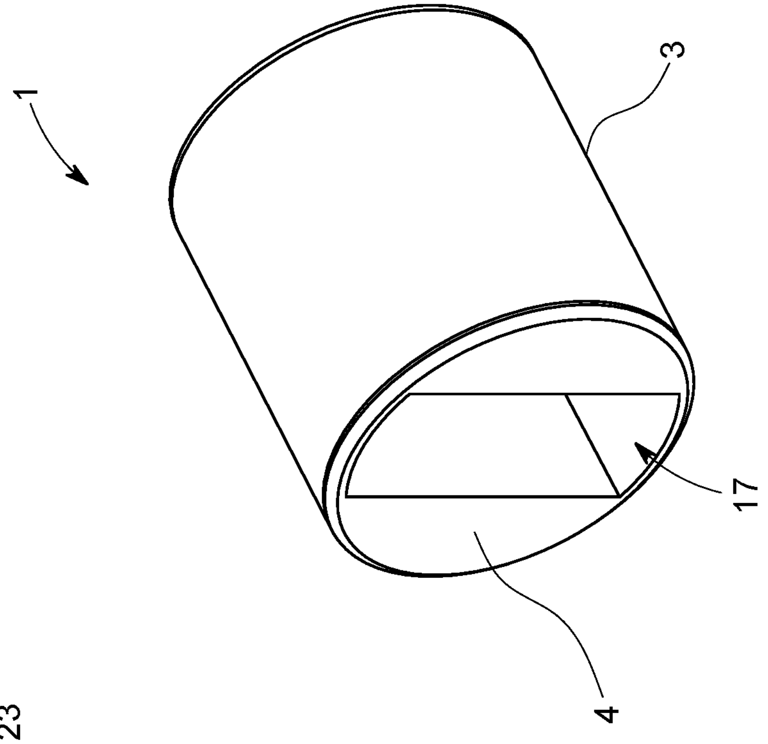
FIG. 5 is perspective view of the watch winder of FIG. 4 is an assembled configuration.
Figure 4:
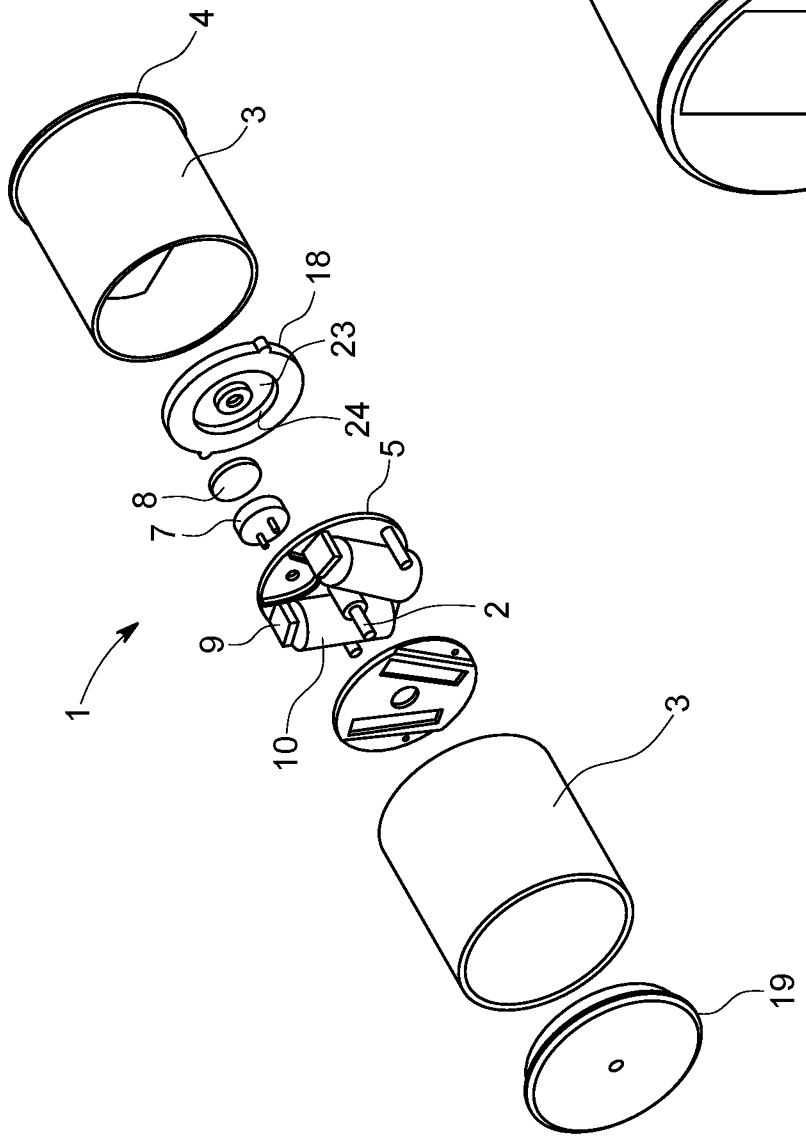
FIG. 4 is a perspective, exploded, view of a watch winder according to the invention.
Figure 6:
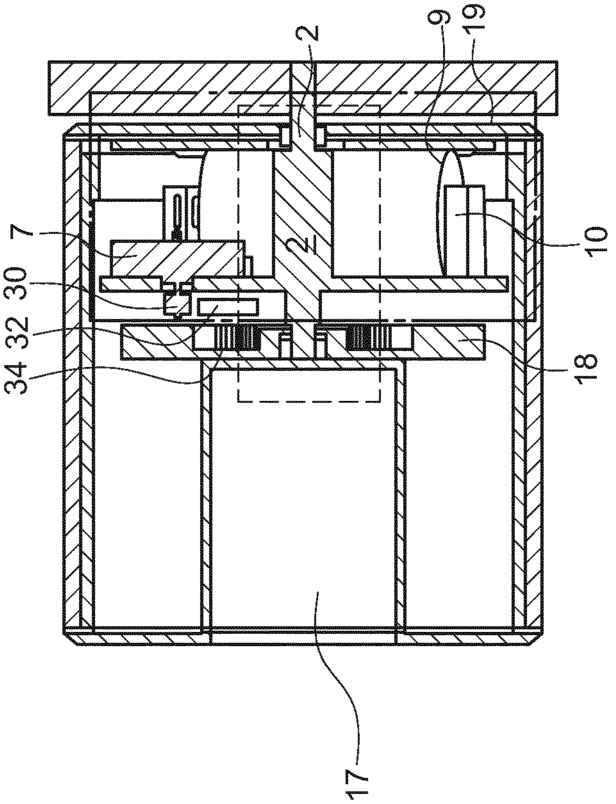
FIG. 6 is side elevational sectional view of the watch winder of FIG. 4.
Figure 7:
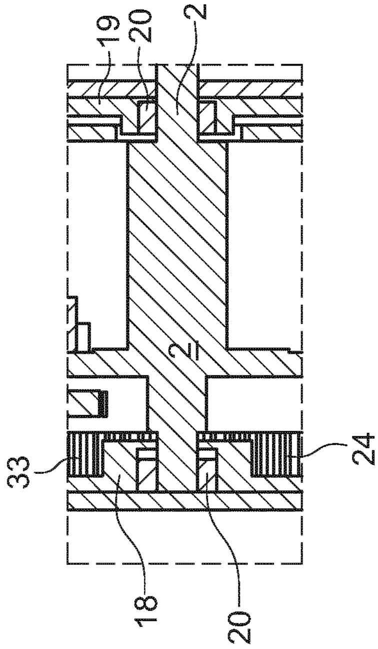
FIG. 7 is a detail of part of the watch winder of FIG. 6.

All publications, patents, patent applications and other references mentioned herein are hereby incorporated by reference in their entireties for all purposes as if each individual publication, patent or patent application were specifically and individually indicated to be incorporated by reference and the content thereof recited in full.

Definitions and General Preferences

Where used herein and unless specifically indicated otherwise, the following terms are intended to have the following meanings in addition to any broader (or narrower) meanings the terms might enjoy in the art:

Unless otherwise required by context, the use herein of the singular is to be read to include the plural and vice versa. The term "a" or "an" used in relation to an entity is to be read to refer to one or more of that entity. As such, the terms "a" (or "an"), "one or more," and "at least one" are used interchangeably herein.

As used herein, the term "comprise," or variations thereof such as "comprises" or "comprising," are to be read to indicate the inclusion of any recited integer (e.g. a feature, element, characteristic, property, method/process step or limitation) or group of integers (e.g. features, element, characteristics, properties, method/process steps or limitations) but not the exclusion of any other integer or group of integers. Thus, as used herein the term "comprising" is inclusive or open-ended and does not exclude additional, unrecited integers or method/process steps.

As used herein, the term "distal" should be understood to mean close to the watch-holding end of the watch holder (i.e. where the watch is inserted into the housing), and likewise the term "proximal" should be understood to mean close to the base of the watch holder.

Exemplification

The invention will now be described with reference to specific Examples. These are merely exemplary and for illustrative purposes only: they are not intended to be limiting in any way to the scope of the monopoly claimed or to the invention described. These examples constitute the best mode currently contemplated for practicing the invention.

Referring to the drawings, and initially to FIGS. 4 to 7, a watch winder according to the invention, indicated generally by the reference numeral 1, is shown. The watch winder comprises a fixed assembly (e.g. a stator) having a central shaft 2 and a rotatable assembly (e.g. rotor) rotatably mounted to the central shaft 2 and comprising a housing (cylindrical drum 3) having distal end 4 configured to receive a watch holder (not shown). A drive assembly is disposed within the housing 3 to rotate the rotatable assembly about the central shaft and comprises a frame 5 fixed to the central shaft 2, a motor 7 and motor drive gear 8 disposed on a distal side of the frame, and battery mountings 9 with two 1.5V batteries 10 operatively connected to the motor 7 disposed on a proximal side of the frame.

In more detail, the rotatable assembly comprises the drum 3 having a watch receiving recess 17, and a distal bearing plate 18 and proximal bearing plate 19, each having an aperture for receipt of the central shaft and bearings 20. The distal and proximal bearing plates are spaced apart along the central shaft to accommodate the drive mechanism that is attached to the central shaft in between the plates. The proximal bearing plate 19 forms a cover at the proximal end of the drum 3, and the distal bearing plate is attached to an inside of the drum intermediate the ends of the drum.

Figure 8:
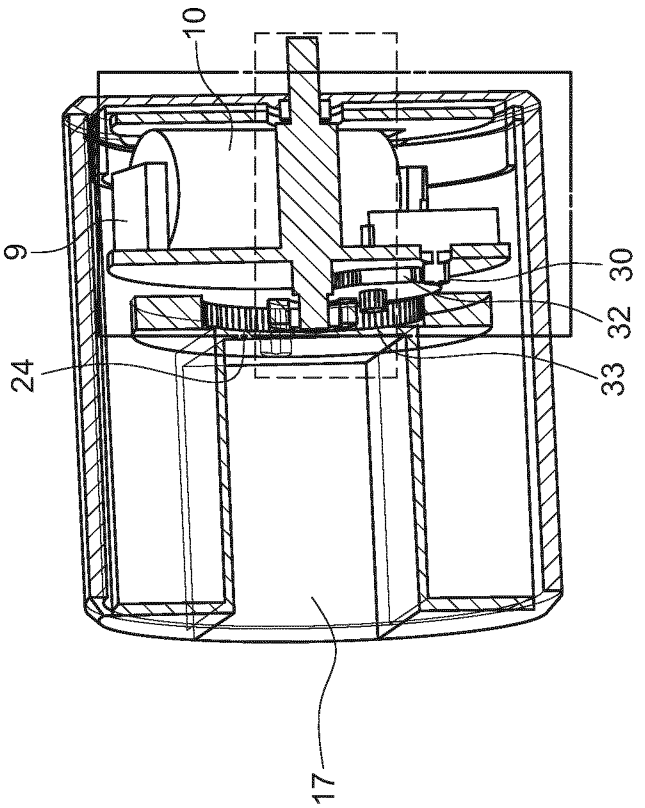
FIG. 8 is perspective sectional view of the watch winder of FIG. 4.
Figure 9:
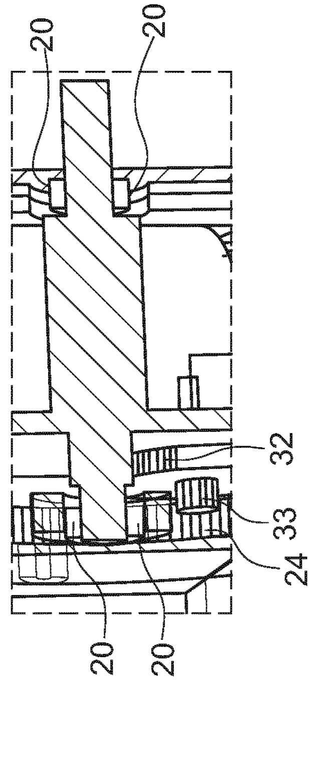
FIG. 9 is a detail of part of the watch winder of FIG. 8.

In more detail, and referring to FIGS. 8 and 9, the distal bearing plate 18 comprises a gear that is operatively connected to the drive gear 8 of the drive assembly. The gear of distal bearing plate is formed from a recessed central part 23 with a circumferential shoulder 24 having teeth. The motor drive gear 8 comprises a first gear 30 operatively connected to the motor 7, and operatively connected to the gear of the bearing plate 18 by a second gear 32 and smaller third gear 33, with the third gear 33 configured to sit in the recessed central part 23 of the bearing plate 18 to cooperate with the gear of the bearing plate gear 19.

Once assembled, all of the parts of the watch winder are contained within the drum, and are not visible except for a distal end of the central shaft 2 which projects through the cover (proximal bearing plate 19). Although not illustrated, the central shaft is generally coupled to a free-standing stand, or a base plate that can be fixed to a support 9 for example a wall or table).

The watch winder of the invention provides a number of advantages over the prior art. First, as the design has been modified to provide the drive assembly on the fixed part of the device, the weight of the rotatable part, and therefore the amount of energy required to rotate the rotatable part, is reduced, making the device more energy efficient. In addition, the provision of a rotatable drum with two bearing plates that are spaced-apart (with the drive assembly accommodated between the plates), reduces the force exerted on the bearings, which results in lower consumption of energy. Moreover, the re-design of the device allows more batteries to be accommodated (2×1.5V batteries, as opposed to 1×AA battery with the known watch winder). This allows the device to work for longer without having to change the batteries.

EQUIVALENTS

The foregoing description details presently preferred embodiments of the present invention. Numerous modifications and variations in practice thereof are expected to occur to those skilled in the art upon consideration of these descriptions. Those modifications and variations are intended to be encompassed within the claims appended hereto.

The invention claimed is:

1. A watch winder (1) comprising:

a fixed assembly having a central shaft (2);

a rotatable assembly rotatably mounted to the central shaft and comprising a housing (3) having distal end configured to receive a watch; and a drive assembly mounted on the fixed assembly and configured to rotate the rotatable assembly about the central shaft and comprising a motor (7), drive gear (8, 30, 32, 33), and a battery assembly (9, 10) operatively connected to the motor, wherein the drive assembly and fixed assembly are mounted within the housing of the rotatable assembly, and the central shaft extends proximally of the housing to mount the watch winder to a support, in which housing is axially mounted on the central shaft (2) by means of a distal bearing plate (18) and a spaced apart proximal bearing plate (19), wherein the drive assembly is fixed to the central shaft between the two spaced apart bearings plates.

2. The watch winder according to claim 1, in which one of the distal or proximal bearing plate comprises a gear operatively coupled to the drive gear of the fixed assembly.

3. The watch winder according to claim 1, in which the distal bearing plate (18) comprises a gear operatively coupled to the drive gear of the fixed assembly.

4. The watch winder according to claim 1, in which the distal bearing plate (18) comprises a gear operatively coupled to the drive gear of the fixed assembly, and in which the gear of the distal bearing plate (18) is disposed on an inner circumference of the distal bearing plate.

5. The watch winder according to claim 1, in which the distal bearing plate (18) comprises a gear operatively coupled to the drive gear of the fixed assembly, in which the gear of the distal bearing plate comprises teeth formed on a circumferential wall (24) of a recessed central portion (23) of the distal bearing plate (18).

6. The watch winder according to claim 4, in which the drive gear of the drive assembly comprises two or more drive gears (30, 32, 33), wherein one of the drive gears (33) is configured to nest in the recessed central portion (23) of the distal bearing plate (18).

7. The watch winder according to claim 1, in which the proximal bearing (19) comprises an end plate of the housing.

8. The watch winder according to claim 1, in which the distal bearing plate is fixed to the housing intermediate the ends of the housing.

9. The watch winder according to claim 1, in which the drive assembly comprises a frame (5) fixed to the central shaft (2) comprising the battery assembly (9, 10) disposed on one side of the frame and the motor (7) and drive gear (8) disposed on an opposite side of the frame.

10. The watch winder according to claim 8, in which the battery assembly (9, 10) is disposed on a proximal side of the frame and the motor (7) and drive gear (8) are disposed on a distal side of the frame.

11. The watch winder according to claim 1, in which the battery assembly (9) comprises a battery mounting configured to receive two LR14 batteries.

12. The watch winder according to claim 1, in which the distal end of the housing has a recess (17) configured to receive a watch or a watch holder.

13. The watch winder according to claim 1, in which the housing comprises a cylindrical drum.

* * * * *